United States Patent [19]

Tester et al.

[11] Patent Number: 5,583,928
[45] Date of Patent: Dec. 10, 1996

[54] DETECTING LOCAL EXCHANGE FAILURE AND RESULTANT CONTROL OF A COMMUNICATIONS NETWORK

[75] Inventors: Brian C. Tester; Donald Fisk, both of Suffolk; Charles A. Swaine, Shropshire, all of England

[73] Assignee: British Telecommunications public limited company, London, England

[21] Appl. No.: 106,946

[22] Filed: Aug. 17, 1993

Related U.S. Application Data

[63] Continuation-in-part of Ser. No. 954,125, Oct. 1, 1992, abandoned.

[30] Foreign Application Priority Data

Jun. 19, 1992 [GB] United Kingdom ................... 9213034

[51] Int. Cl.[6] .............................. H04M 3/36; H04Q 3/54
[52] U.S. Cl. ........................................ 379/220; 379/221
[58] Field of Search ................................ 379/220, 221, 379/279, 207, 201, 142

[56] References Cited

U.S. PATENT DOCUMENTS

| | | |
|---|---|---|
| 3,394,231 | 7/1968 | Hopper et al. . |
| 3,536,842 | 10/1970 | Ewin et al. . |
| 3,560,663 | 2/1971 | Lee . |
| 3,591,724 | 7/1971 | Yaku et al. . |
| 3,705,523 | 12/1972 | Alouisa . |
| 4,284,852 | 8/1981 | Szybicki et al. ........................ 379/221 |
| 4,410,765 | 10/1983 | Hestad ................................. 379/220 |
| 4,699,113 | 5/1987 | Ash et al. . |
| 4,704,724 | 11/1987 | Krishnan et al. . |
| 4,756,019 | 7/1988 | Szybicki ............................... 379/221 |
| 4,788,721 | 11/1988 | Krishnan et al. . |
| 4,862,496 | 8/1989 | Kelly et al. ............................ 379/221 |
| 4,873,517 | 10/1989 | Baratz et al. . |
| 4,931,941 | 6/1990 | Krishnan ............................... 379/220 |
| 4,943,998 | 7/1990 | Bauer .................................. 379/220 |
| 5,014,262 | 5/1991 | Harshavardhana . |
| 5,021,968 | 6/1991 | Ferketic . |
| 5,058,105 | 10/1991 | Mansour et al. . |
| 5,068,892 | 11/1991 | Livanos . |
| 5,101,451 | 3/1992 | Ash et al. . |
| 5,163,042 | 11/1992 | Ochiai ................................. 379/220 |

FOREIGN PATENT DOCUMENTS

| | | | |
|---|---|---|---|
| 0258654 | 3/1988 | European Pat. Off. ............... 379/221 |
| 0334612 | 9/1989 | European Pat. Off. ............... 379/220 |

OTHER PUBLICATIONS

Szybicki "Adaptive, Tariff Dependant Traffic Routing and Network Management in Multi-Service Telecommunications Networks", Teletraffic Issues in an Advanced Information Society, pp. 615–622.

Mase et al, "Advanced Traffic Control Methods for Network Management", IEEE Communications Magazine 28 (1990) Oct., No. 10, New York, US, pp. 81–88.

R. R. Stacey et al; "Dynamic Alternative Routing In The British Telecom Trunk Network"; British Telecommunications plc; pp. 984–988.

(List continued on next page.)

Primary Examiner—Krista M. Zele
Assistant Examiner—Thomas F. Presson
Attorney, Agent, or Firm—Nixon & Vanderhye P.C.

[57] ABSTRACT

Failure of a local exchange in a communications network (such as the PSTN) is detected by monitoring a combination of parameters. Each parameter in the combination is monitored for meeting predetermined criteria. In particular, a local exchange failure is recognized when the average value of the All Circuits Engaged (ACE) parameters over all traffic routes into a local exchange rises in a significant manner and the average value of the Circuits in Service (CCTS IS) parameters over all traffic routes into that exchange decreases in a significant manner.

12 Claims, 2 Drawing Sheets

OTHER PUBLICATIONS

Langlois et al, "Dynamic Congestion Control in Circuit–Switched Telecommunications Networks", Proceedings of the 13th International Teletraffic Congress; 19 Jun. 1991, pp. 127–132.

Gifford, "Adaptive Routing and Traffic Control in Damaged Circuit Switched Networks", IEEE Military Communications Conference, vol. 1, 19 Oct. 1987, pp. 7–12.

Stach, "Graph Analysis and Rule Based Paradigms for the Identification, Containment and Clearing of Switch Congestion in Non–Hierarchical Circuit Switched Networks", Proceedings of the National Communications Forum, vol. 43, No. 2/4, Oct. 1989, pp. 474–482.

Passeron, "Network Supervision and Management", Commutation & Transmission, vol. 13, No. SPEC, 1991, pp. 45–52, Paris, FR.

Mase et al, "Advanced Traffic Control for Network Management", IEEE Communications Magazine, vol. 28, No. 10, Oct. 1990, New York, pp. 82–88.

Chemouil et al, "Integrated Network Management and Control", Computer Networks and ISDN Systems, vol. 20, No. 1/5, Dec. 1990, Amsterdam, NL, pp. 143–153.

Turner et al, "A New Call Gapping Algorithm for the Network Traffic Management", Proceedings of the 13th International Teletraffic Congress; 19 Jun. 1991, Copenhagen, DK, pp. 121–126.

Pham, "Control Loop for Traffic Management of Network Under Focussed Overloads", Proceedings of the 13th International Teletraffic Congress; 19 Jun. 1991, Copenhagen, DK, pp. 315–322.

Ash et al, "Real–Time Network Routing in a Dynamic Class–of–Service Network", Proceedings of the 13th International Teletraffic Congress, Jun. 1991, Copenhagen, DK, pp. 187–194.

Chaudhary et al, "Technology–Trial of Dynamic Traffic Routing with 5 Minute Updates", IEEE Global Telecommunications Conference—Paper 48.3, vol. 3, 2 Dec. 1991, Phoenix, pp. 1696–1700.

EPO Search Reports.

DETECTING LOCAL EXCHANGE FAILURE AND RESULTANT CONTROL OF A COMMUNICATIONS NETWORK

This is a continuation-in-part of our prior U.S. patent application Ser. No. 07/954,125, filed Oct. 1, 1992, now abandoned. This application is also related to our commonly assigned copending application Ser. No. 08/106,940, filed Aug. 17, 1993, which is, in turn, a CIP of our prior copending U.S. patent application Ser. No. 07/954,123, filed Oct. 1, 1992.

BACKGROUND OF THE INVENTION

1. Field of the Invention

This invention relates to a method of controlling a communications network which includes at least one local exchange connected by routes to one or more parent trunk exchanges each being one of a plurality of trunk exchanges interconnected by trunk routes. It is particularly concerned with the detection of local exchange failures in such networks.

2. Related Art

Commonly a local exchange is associated with a home exchange, through which incoming calls to the local exchange are routed, and a security exchange, through which outward calls from the local exchange are routed, in normal operation. The security exchange is so called because it can also be used to route incoming calls to the local exchange if the home exchange fails. The security and home exchanges are collectively referred to as the parent exchanges of the local exchange. Exchanges other than the parent exchanges are referred to as far end trunk exchanges of the local exchanges.

Near real-time network traffic management (NTM) is an essential component of network management if optimal traffic performance in terms of call throughput is to be ensured. To give an indication of the volume of traffic which may be involved, BT's trunk network in the United Kingdom currently handles approximately six million call attempts per hour during the busy periods which is equivalent to 1,700 call attempts per second. Given such a volume of traffic it is essential that any network difficulties are detected and controlled as quickly as possible. For example, difficulties are often encountered by network traffic managers due to abnormal traffic patterns which can be caused by events such as phone-ins, tele-votes and public holidays (for example Christmas Day and New Year's Eve/Day). In all these cases traffic in the network varies widely from the normal level, sometimes quite spectacularly, and the network must be controlled to maintain the best overall network performance.

With the introduction of digital switches such as System X it is possible to monitor closely the performance of each exchange and the routes between them and to the subscribers. BT's Network Traffic Management System (NTMS) currently receives statistics on upwards of 37,000 routes from 490 exchanges in the UK every five minutes, which measurement period was chosen to be a long enough period to be able to obtain a statistically reliable measurement of the network performance whilst being short enough to allow effective real-time control of the network.

The information received by the NTMS is processed to provide CCITT recommended parameters. For instance, these include the Percentage Overflow (OFL) and All Circuits Engaged (ACE) parameters. The parameter values are then compared with thresholds to determine if any difficulties exist on the monitored network elements.

Usually the first indication of a network problem is when an 'exception' is displayed on a wall-board, or on a graphical interface at an individual manager's workstation, at a Traffic Management Centre. Exceptions are those parameter values, calculated from network element measurements, which deviate sufficiently from a predetermined threshold for that value. The exceptions are ranked in a priority order with the top 20 displayed. However, due to the manner in which the thresholds are set by the network traffic managers, some exceptions do not necessarily indicate a difficulty as thresholds are percentage-based and set a value which ensures all potential difficulties are captured. This results in exceptions being displayed that are occasionally spurious or insignificant. The exceptions therefore need to be examined in more detail to determine if a real difficulty exists and whether it warrants any action. To help in this activity several information sources are currently used by the network traffic managers.

The NTMS provides near real-time surveillance and monitoring of the network's status and performance. It provides the network traffic managers with information to enable them take prompt action to control the flow of traffic to ensure the maximum utilization of the network in all situations. The NTMS allows network traffic managers to look at the raw statistics as well as derived generic parameters and to compare traffic patterns over the last few measurement periods to isolate any trends.

An On-Line Traffic Information System (OTIS) takes the measurement of statistics from the NTMS system and processes them to provide summarised historical data for daily and weekly traffic patterns. This system allows the network traffic managers to examine historical traffic patterns to detect any radical shifts in traffic.

A data management system provides the network traffic managers with an up-to-date copy of the routing tables at all trunk exchanges. This information is used to check the routes to which calls can be routed, which controls are in force and the routing algorithms being used.

There is also a broadcast speaker facility which connects the world-wide network management centre to all the regional centres.

Once a potential difficulty has been detected, acknowledged and analyzed, it is characterised and a decision made whether to control it using the available range of expansive and restrictive controls to either allow alternative traffic paths through the network or to restrict or block call attempts to particular areas, respectively. The situation must then be monitored to ensure the controls are having the desired effect and that they are removed as soon as a problem has been dealt with effectively.

One class of exception associated with telecommunications networks is the failure of a local exchange.

Although local exchange failures occur relatively frequently they rarely result in a problem that requires intervention from the network traffic managers. This is because of the unit's built-in self-correcting mechanisms.

For example, if a problem occurs at a System X exchange there are a number of stages it will go through to try and recover. These are:

a) Process Rollback—this is a software routine and service is not affected. A Rollback shows on the NTMS as an exchange alarm;

b) Restart—the exchange automatically restarts and service is affected;

c) System Initialisation—the software is initialised from a backing store; and d) Manual Reload—part or all of the system is reloaded manually.

When a unit is in trouble it will first try four or five Rollbacks and only if these are unsuccessful in curing the problem will it perform an automatic Restart. If a Restart occurs this can be detected from NTMS statistics.

Normally a Restart is sufficient to return the unit to a fully working condition. However, sometimes when the unit returns it still does not perform correctly so it needs to be monitored to ensure that it is handling calls correctly. The last two stages, c) and d), occur only rarely when a Restart fails.

In the majority of cases no action is therefore necessary. However, when it is, a control such as route gapping may be used but it is present practice only to apply route gapping if the exchange is likely to be isolated for another five minutes and the calling levels are high.

Controls available might comprise not only route gapping but also other forms of call gapping, and code blocking. Route gapping however affects all calls down a particular route. Call gapping and code blocking can be applied to be more destination specific.

When an exchange is in difficulty the first function it stops is the production of performance statistics. (In System X exchanges these are known as MSS statistics, from the Management Statistics Subsystem.) In some cases this means the statistics from the affected exchange are all zero even when it is in fact handling calls correctly. In such cases it is therefore necessary to monitor the network to determine local exchange failures other than by looking at the parameters issued by the local exchanges. To do this successfully it is necessary to monitor selected parameters which change their value in a manner distinctive of such a local exchange failure.

SUMMARY OF THE INVENTION

According to a first aspect of the present invention a method of controlling a communications network, which includes at least one local exchange connected by one or more routes to one or more parent trunk exchanges each parent trunk exchange being one of a plurality of trunk exchanges interconnected by trunk routes, is characterised in that controls are applied to the trunk exchanges of the network to deal with a local exchange failure when the average value of the All Circuits Engaged (ACE) parameters over all traffic routes into a local exchange is greater than a first threshold and there has been a decrease in the average value of the Circuits in Service (CCTS IS) parameters over all traffic routes into the local exchange which decrease is greater than a second threshold over the duration of a measurement period.

Monitoring both the ACE and CCTS IS parameters distinguishes from other failures such as route or PCM failure.

A network may be controlled according to the present invention by an apparatus to which is input the network parameters and which provides control information to the network controller when the local exchange failure condition is detected.

Alternatively, the network can be controlled automatically on detection of the local exchange failure without the intervention of the network manager.

The controls applied to the network may be route gapping applied to selected trunk exchanges, for example, as described in more detail in an application filed by the present applicants on the same day as this one. The present invention is, however, not concerned with the particular controls applied once the local exchange failure has been detected by the method of the present invention.

Various values of the first and second thresholds can be selected according to the characteristics of the particular network to which the present invention is to be applied.

The ACE parameter for traffic routes into a failed local exchange has been found to rise rapidly from the normal value of zero. It has been found that a first threshold of at least 10% is suitable.

The CCTS IS parameter of traffic routes into a local exchange falls to zero in the event of its failure. To provide flexibility in the application of the invention to different normal traffic conditions the percentage decrease of the CCITT IS parameter is monitored rather than the absolute value of the parameter. The second threshold should be large enough to avoid triggering by normal fluctuation—a second threshold of at least 20% has been found to be preferable.

The preferable measurement period is of the order of five minutes.

According to a second aspect of the present invention a communications network, including at least one local exchange which is connected by one or more routes to one or more parent trunk exchanges, each parent trunk exchange being one of a plurality of trunk exchanges interconnected by trunk routes, and control means for controls to the trunk exchanges of the network, is characterised in that there is included a system responsive to the average value of the All Circuits Engaged (ACE) parameters over all traffic routes into a local exchange being greater than a first threshold and a decrease in the average value of the Circuits in Service (CCTS IS) parameters over all traffic routes into the local exchange greater than a second threshold over the duration of a measurement period to provide a signal indicating That the local exchange has failed.

According to a third aspect of the present invention there is provided a communications network, including at least one local exchange which is connected by one or more routes to one or more parent trunk exchanges, each parent trunk exchange being one of a plurality of trunk exchanges interconnected by trunk routes, and control means for applying controls to the trunk exchanges of the network, characterised in that there is included a system responsive to the average value of the All Circuits Engaged (ACE) parameters over all traffic routes into the local exchange being greater than a first threshold and a decrease in the average value of the Circuits in Service (CCTS IS) parameters over all traffic routes into the local exchange greater than a second threshold over the duration of a measurement period to cause controls to be applied to the network by means of the control means to ameliorate the effects of the failure of the local exchange on the network.

It might be noted that, for the purpose of the present specification, "traffic route" or "route" is used to describe a route in a network primarily between exchanges and does not normally include the link between a subscriber's customer premises equipment and the local exchange.

BRIEF DESCRIPTION OF THE DRAWINGS

An embodiment of the invention will now be described by way of example only with reference to the accompanying drawings of which.

DETAILED DESCRIPTION OF EXEMPLARY EMBODIMENTS

Figure 1:
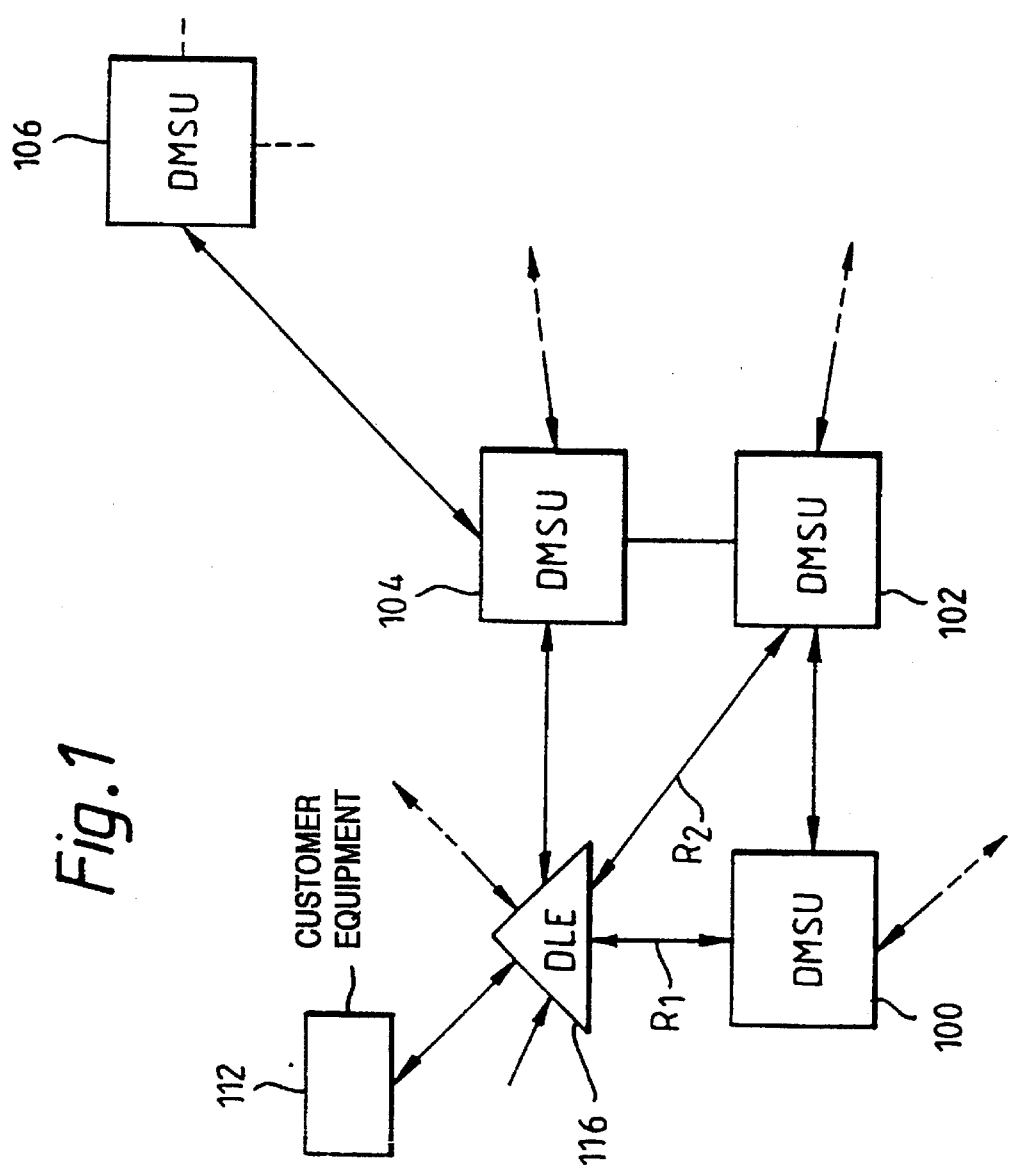
FIG. 1 is a schematic representation of a network controllable by the method of the present invention.

Referring to FIG. 1, a telecommunications network comprises a number of digital main switch units (DMSUs)—trunk exchanges—of which only five are shown for clarity and are referenced 100, 102, 104, 106, 108 and 110. Subscribers' customer premises equipment, of which only two are shown referenced 112 and 114, are connected to the trunk exchanges 102 to 110 via respective digital local exchanges (DLE) 116 and 118.

The DLE 116 is connected to the DMSUs 100 and 102 via traffic routes R1 and R2, respectively, through which incoming calls to the subscribers attached to the DLE 116, including subscriber 112, are routed. The DMSUs 100 and 102 are commonly referred to as the home trunk exchanges for the DLE 116. The DLE 116 is also connected to the DMSU 104 through which outgoing calls from the DLE are routed. This is usually called a security exchange as incoming calls to the exchange 116 can be routed through it should one of the DMSUs 100 and 102 fail.

Similarly, the DMSU 108 is the home exchange for the digital local exchange 118.

The home and security exchanges associated with a DLE are collectively referred to as the parent exchanges of that DLE.

Those exchanges other than the parent exchanges are referred to as the far-end trunk exchanges of a given digital local exchange. For the network of FIG. 1 all exchanges other than trunk exchanges 100, 102 and 104 are regarded as far end trunk exchanges for the digital local exchange 116, for example.

The method of controlling a telecommunications network such as that illustrated in FIG. 1 according to the present invention will now be described with additional reference to FIG. 2 which shows a network control system implementing the method of the present invention.

Figure 2:
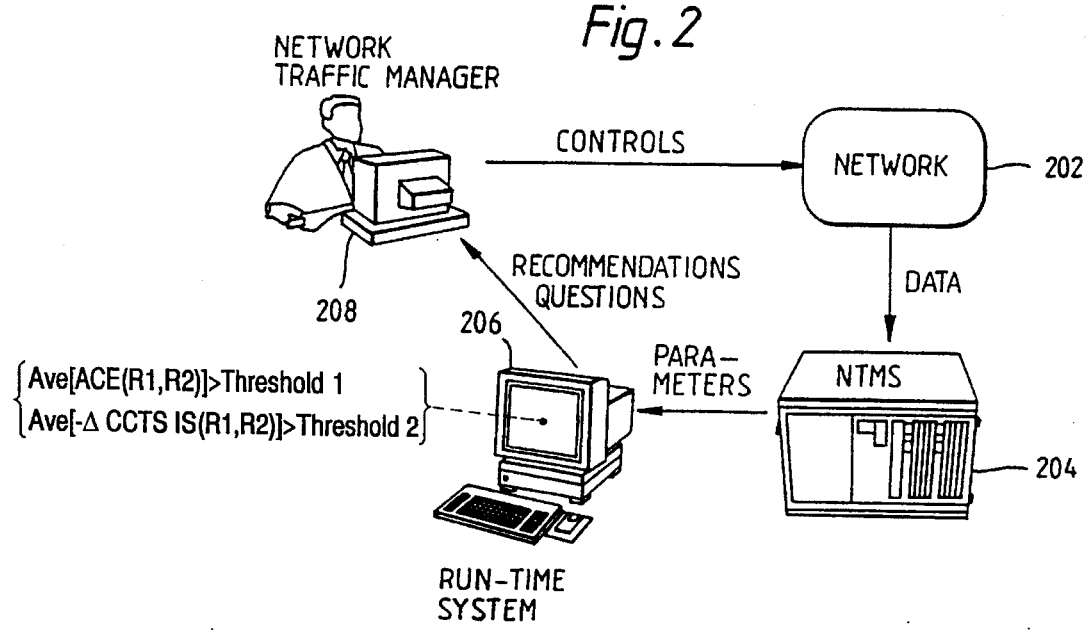
FIG. 2 is a schematic representation of a control system for implementing the method of the present invention.

Referring to FIG. 2, the network of FIG. 1 is denoted by box 202. Every five minutes, which is the measurement period of the network of FIG. 1, a set of statistics is generated by the digital exchanges of the network 202 which is processed by an NTMS system 204 to provide generic measurement values including those of the CCITT recommendation. These parameters are input to a run-time system 206 which applies rules to the received parameters from the NTMS 204 by means of an appropriately coded expert system. The run-time system 206 provides recommendations to aid a network traffic manager 208 on detecting a local exchange failure in the network 202 according to the method of the present invention.

The run-time system 206 employs a three phase cycle in which recommendations for the need for local exchange failure control actions are passed to the network traffic manager 208.

The run-time system 206 monitors the exchanges in the manner which will now be described with specific reference to the failure of the local exchange 116.

When the ACE parameters averaged over the traffic routes R1 and R2 into the local exchange 116 is greater than 10% and there has been a decrease in the CCTS IS parameters averaged over the traffic routes R1 and R2 into the local exchange 116 greater than 20% over the duration of the 5 minute measurement period an appropriate indication of the need for controls is issued to the network manager 208.

Figure 3:
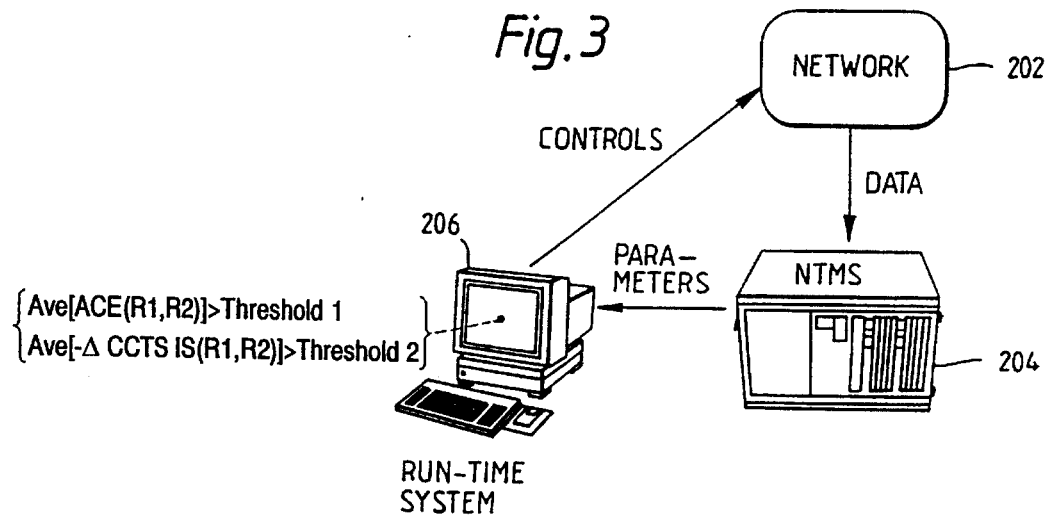
FIG. 3 is a schematic representation of a control system for implementing the method of the present invention using direct control of a network by a computer.

It is envisaged that the run-time system 206 may directly control the network to apply the method of the present invention as shown in FIG. 3 but at present it is expected that it will be preferable for a network traffic manager 208 to implement the method of the present invention to allow overriding of the recommendations at his or her discretion.

The method of the present invention has been simulated on a computer representation of BT's UK telecommunications network in which the run-time system 206 comprises a PROLOG-based expert system coded with the rules necessary to provide the recommendations described above in response to the appropriate CCITT parameters from the NTMS 204.

The particular system employed was a QUINTUS PROLOG expert system run on a Sun Sparc station. Parameters generated during real network activity were recorded for the entire GB network for four, 5-minute measurement periods and stored as a data file on the computer.

A C-language program provided an interface between the raw parameters in the computer file and the expert system in that as the expert system required information about the network, the C-language program calculated the data from the raw parameters.

The conditions necessary to implement the method of the present invention were submitted to the expert system, along with other queries about the network performance every five minutes, and where appropriate, the expert system responded to generate the information required for presentation to the network manager.

The particular thresholds adopted in order to determine when a local exchange failure has occurred can be set according to the particular network 202 to which the method is to be applied. The present invention is not restricted to any particular value of threshold adopted in the above described specific embodiment.

Although embodiments of the present invention find particular application in the complex telecommunications networks of the PSTNs (Public Switched Telecommunications Networks), they should not be considered to be limited necessarily to networks carrying voice transmissions.

We claim:

1. A method of controlling a communications network, which includes at least one local exchange connected by one or more routes to one or more parent trunk exchanges, each parent trunk exchange being one of a plurality of trunk exchanges interconnected by trunk routes, said method comprising:

detecting a local exchange failure by detecting when (i) the average value of the All Circuits Engaged (ACE) parameters over all traffic routes into a local exchange is greater than a first threshold and (ii) there has been a decrease in the average value of the Circuits in Service (CCTS IS) parameters over all traffic routes into the local exchange greater than a second threshold over the duration of a measurement period.

2. A method as in claim 1 in which the first threshold at least 10%.

3. A method as in claim 1 or 2 in which the second threshold is at least 20%.

4. A method as in claim 1 or 2 in which the measurement period is on the order of five minutes.

5. A communications network including:

at least one local exchange which is connected by one or more routes to one or more parent trunk exchanges, each parent trunk exchange being one of a plurality of trunk exchanges interconnected by trunk routes, and control means for applying controls to the network and having a system responsive to (i) the average value of the All Circuits Engaged (ACE) parameters over all traffic routes into the local exchange being greater than a first threshold, and (ii) a decrease in the average value of the Circuits in Service (CCTS IS) parameters over all traffic routes into the local exchange being greater than a second threshold, over the duration of a measurement period, to provide a signal indicating that the local exchange has failed.

6. A communications network including:

at least one local exchange which is connected by one or more routes to one or more parent trunk exchanges, each parent trunk exchange being one of a plurality of trunk exchanges interconnected by trunk routes, and control means for applying controls to the network and having a system responsive to (i) the average value of the All Circuits Engaged (ACE) parameters over all traffic routes into the local exchange being greater than a first threshold and (ii) a decrease in the average value of the Circuits in Service (CCTS IS) parameters over all traffic routes into the local exchange being greater than a second threshold over the duration of a measurement period to cause controls to be applied to the network by the control means to ameliorate the effects of the failure of the local exchange on the network.

7. A method of controlling a communications network, which network includes at least one local exchange connected by one or more routes to one or more parent trunk exchanges, each parent trunk exchange being one of a plurality of trunk exchanges interconnected by trunk routes, said method comprising:

i) monitoring the average value of an All Circuits Engaged (ACE) parameter over all traffic routes into said at least one local exchange, over a measurement period;

ii) monitoring the average value of a Circuits in Service (CCTS IS) parameter over all traffic routes into said at least one local exchange, over said measurement period;

iii) comparing each of said monitored average values from steps i) and ii) with predetermined respectively corresponding threshold values; and iv) in the event that said comparison step iii) meets predetermined conditions applying traffic flow controls in the network to accommodate failure of said at least one local exchange;

wherein said predetermined conditions are as follows:

a) the average value of the All Circuits Engaged (ACE) parameters over all traffic routes into said at least one local exchange for said measurement period is greater than a first threshold; and b) there has been a decrease in the average value of the Circuits in Service (CCTS IS) parameters over all traffic routes into said at least one local exchange for said measurement period greater than a second threshold.

8. A method as in claim 7 in which the first threshold is at least 10%.

9. A method as in claim 7 or 8 in which the second threshold is at least 20%.

10. A method as in claim 7 or 8 in which the measurement period is on the order of five minutes.

11. A communications network including at least one local exchange which is connected by one or more routes to one or more parent trunk exchanges, each parent trunk exchange being one of a plurality of trunk exchanges interconnected by trunk routes, and control means for applying controls to the network, said network comprising:

i) a performance parameter monitor which monitors the average value of an All Circuits Engaged (ACE) parameter over all traffic routes into said at least one local exchange over a measurement period, and monitors changes in the average value of a Circuits in Service (CCTS IS) parameter over all traffic routes into said at least one local exchange over said measurement period;

ii) a performance parameter comparator which compares the monitored average value of the ACE parameter with a first threshold, and compares the monitored changes in the average value of the CCTS IS parameter with a second threshold; and iii) a signal output triggered by an output of the comparator to provide a signal indicating that the local exchange has failed, wherein the comparator is arranged to trigger said signal output in the event that the monitored average value of the ACE parameter exceeds said first threshold, and a decrease in the average value of the CCTS IS parameter exceeds the second threshold, for said measurement period.

12. A communications network as in claim 11 further comprising means for providing said signal to network control means for ameliorating effects of the failure of the local exchange on the network.

* * * * *